US008681136B2

(12) United States Patent
Kubota

(10) Patent No.: US 8,681,136 B2
(45) Date of Patent: Mar. 25, 2014

(54) VEHICLE DISPLAY APPARATUS

(75) Inventor: Masatoshi Kubota, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 318 days.

(21) Appl. No.: 13/010,728

(22) Filed: Jan. 20, 2011

(65) Prior Publication Data

US 2011/0261039 A1 Oct. 27, 2011

(30) Foreign Application Priority Data

Apr. 27, 2010 (JP) ................................ 2010-101981

(51) Int. Cl.
*G06F 3/038* (2013.01)

(52) U.S. Cl.
USPC .......................................................... 345/207

(58) Field of Classification Search
USPC .......................................................... 345/207
See application file for complete search history.

(56) References Cited

U.S. PATENT DOCUMENTS

| | | | | |
|---|---|---|---|---|
| 2002/0114147 | A1* | 8/2002 | Harter, Jr. | 362/29 |
| 2007/0124029 | A1* | 5/2007 | Hattori et al. | 701/1 |
| 2008/0252579 | A1* | 10/2008 | Kato et al. | 345/87 |

FOREIGN PATENT DOCUMENTS

| | | |
|---|---|---|
| JP | 6-001471 Y2 | 11/1989 |
| JP | 2009-166839 | 7/2009 |
| JP | 2010-012995 | 1/2010 |

OTHER PUBLICATIONS

Japanese Office Action for corresponding JP Application No. 2010-101981, Aug. 27, 2013.

* cited by examiner

*Primary Examiner* — Kent Chang
*Assistant Examiner* — Nelson D Runkle, III
(74) *Attorney, Agent, or Firm* — Ditthavong Mori & Steiner, P.C.

(57) ABSTRACT

A vehicle display apparatus includes a first indicator, a second indicator, and an illuminance detector. The illuminance detector is configured detect illuminance outside a vehicle. Display luminance of the second indicator is capable of being changed in a specific luminance range in accordance with the illuminance outside the vehicle detected by the illuminance detector irrespective of daytime or nighttime. A luminance setting device is configured to set the specific luminance range. A controller is configured to increase or decrease the display luminance of the second indicator at least in a portion of the specific luminance range set by the luminance setting device based on display luminance for each of daytime and nighttime of the first indicator set by the luminance setting device.

14 Claims, 7 Drawing Sheets

VEHICLE DISPLAY APPARATUS

CROSS-REFERENCE TO RELATED APPLICATIONS

The present application claims priority under 35 U.S.C. §119 to Japanese Patent Application No. 2010-101981, filed Apr. 27, 2010, entitled "Vehicle Display Apparatus". The contents of this application are incorporated herein by reference in their entirety.

BACKGROUND OF THE INVENTION

1. Field of the Invention

The present invention relates to a vehicle display apparatus.

2. Description of the Related Art

A vehicle having a head-up display (HUD) as an indicator is being developed. A HUD can present information, such as vehicle speed, car-navigation guidance information (e.g., arrows for routing assistance), and information notifying the presence of a pedestrian at nighttime, for example. A vehicle on which a HUD is mounted can also incorporate a meter (see, for example, Japanese Examined Utility Model Registration Application Publication No. 6-001471).

The technique described in this literature commonly switches luminance of a meter 12 and that of a HUD 15 at daytime by the use of an up/down switch 3 (see, for example, 28-41 lines in the left-hand column of page 3) and adjusts the display luminance of the HUD based on the display luminance of the meter at nighttime (see, for example, 24-50 lines in the right-hand column of page 3). This aims to automatically set balance between the nighttime luminance of the meter and that of the HUD at a suited one (see, for example, 2-7 lines in the left-hand column of page 4).

As described above, at both daytime and nighttime, when the luminance of the HUD is adjusted, the luminance of the meter is also adjusted. Thus, it is impossible to individually set the luminance of the meter and that of the HUD, and this may impair usability. For the technique described in the above literature, because the luminance of the HUD depends on the setting made by the up/down switch at daytime and is set according to the luminance (specific value) of the meter at nighttime, the influence of the outside of the vehicle is not reflected. However, the display luminance of the HUD is preferably controlled according to illuminance outside the vehicle irrespective of daytime or nighttime. If the HUD simply has individually set values of daytime luminance and nighttime luminance, it is difficult to achieve sufficient usability.

SUMMARY OF THE INVENTION

According to one aspect of the present invention, a vehicle display apparatus includes a first indicator, a second indicator, a luminance setting device, a controller, an illuminance detector. The first indicator is disposed in a cabin of a vehicle. Display luminance of the first indicator is able to be set for daytime and for nighttime. The luminance setting device is configured to set the display luminance of the first indicator and display luminance of the second indicator. The controller is configured to control the display luminance of the second indicator based on the display luminance of the first indicator. The illuminance detector is configured detect illuminance outside the vehicle. The display luminance of the second indicator is capable of being changed in a specific luminance range in accordance with the illuminance outside the vehicle detected by the illuminance detector irrespective of daytime or nighttime. The luminance setting device is configured to set the specific luminance range. The controller is configured to increase or decrease the display luminance of the second indicator at least in a portion of the specific luminance range set by the luminance setting device based on the display luminance for each of daytime and nighttime of the first indicator set by the luminance setting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
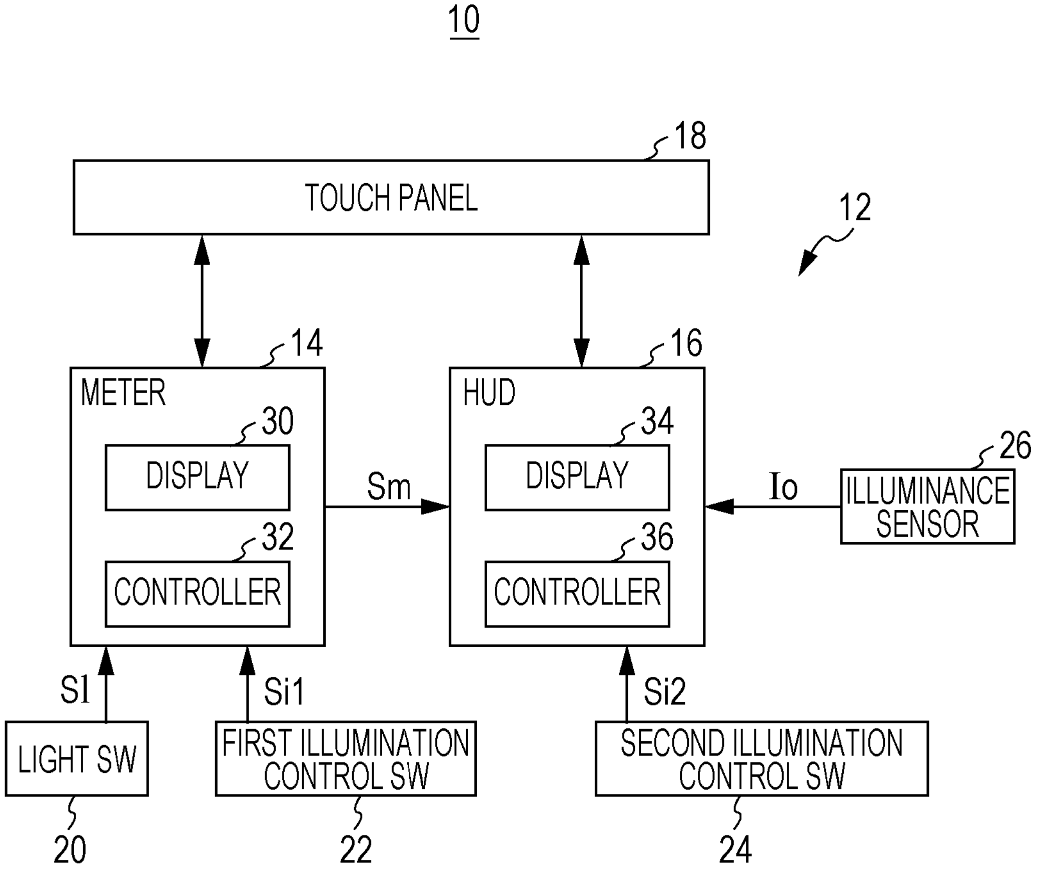
FIG. 1 is a block diagram of a vehicle on which a vehicle display apparatus is mounted according to an embodiment of the present invention.

The embodiments will now be described with reference to the accompanying drawings, wherein like reference numerals designate corresponding or identical elements throughout the various drawings.

1. Description of General Structure

[General Structure]

FIG. 1 is a block diagram of a vehicle 10 on which a vehicle display apparatus 12 is mounted according to the embodiment of the present invention. The vehicle 10 can be a gasoline-driven car, for example. Alternatively, it may be an electric car, including a hybrid car and a fuel-cell vehicle. The vehicle display apparatus 12 includes a meter 14, a head-up display (HUD) 16, a touch panel 18, a light switch 20 (hereinafter referred to as "light SW 20"), a first illumination control switch 22 (hereinafter referred to as "first illumination control SW 22"), a second illumination control switch 24 (hereinafter referred to as "second illumination control SW 24"), and an illuminance sensor 26.

The meter 14 includes a meter display 30 (hereinafter also referred to as "display 30") and a meter controller 32 (hereinafter also referred to as "controller 32"). The display 30 is disposed in an instrument panel (not illustrated) and presents information, such as vehicle speed, the remaining amount of gasoline, engine RPM, and gear position. The controller 32 controls the display 30 using a detected value of various sensors (not illustrated) of the vehicle 10.

The HUD 16 includes a HUD display 34 (hereinafter also referred to as "display 34") and a HUD controller 36 (hereinafter also referred to as "controller 36"). The display 34 is disposed in a windshield (not illustrated) of the vehicle 10 and presents information, such as vehicle speed, car-navigation guidance information (e.g., arrows for routing assistance), and information notifying the presence of a pedestrian at nighttime. The controller 36 controls the display 34 using a detected value of various sensors of the vehicle 10. Information displayed on the HUD display 34, which is disposed in the windshield, is more difficult to see than that on the meter display 30. Because of this, luminance of the HUD display 34 (HUD luminance Lh) [cd/m$^2$] is set higher than luminance of the meter display 30 (meter luminance Lm) [cd/m$^2$].

The touch panel 18 functions as an input device for use in changing settings of the meter 14 and the HUD 16 and outputs the input contents to the controller 32 and the controller 36. The touch panel 18 can also display a routing assistance image of a navigation system (not illustrated), a received image of a digital method, and a reproduced image of recorded information.

The light SW 20 controls on and off states of a headlamp and a side-marker lamp (both not illustrated) of the vehicle 10. With this, a driver can manually select from among a position at which both the headlamp and the side-marker lamp are in an off state, a position at which the headlamp is in an off state and the side-marker lamp is in an on state, and a position at which both the headlamp and the side-marker lamp are in an on state. The state of the light SW 20 is provided from the light SW 20 to the meter controller 32 by a light signal S1.

The first illumination control SW 22 is a switch for setting the meter luminance Lm. The state of the first illumination control SW 22 is transmitted to the meter controller 32 through a control signal Si1.

The second illumination control SW 24 is a switch for setting the HUD luminance Lh. The state of the second illumination control SW 24 is transmitted to the HUD controller 36 through a control signal Si2.

The illuminance sensor 26 can be arranged in the vicinity of the windshield in the cabin of the vehicle 10, for example, and detects illuminance outside the vehicle 10 (outside illuminance Io) [lx]. The detected outside illuminance Io is provided to the HUD controller 36.

2. Control of Luminance of Meter 14 and HUD 16

(1) Control of Luminance of Meter 14

Figure 2:
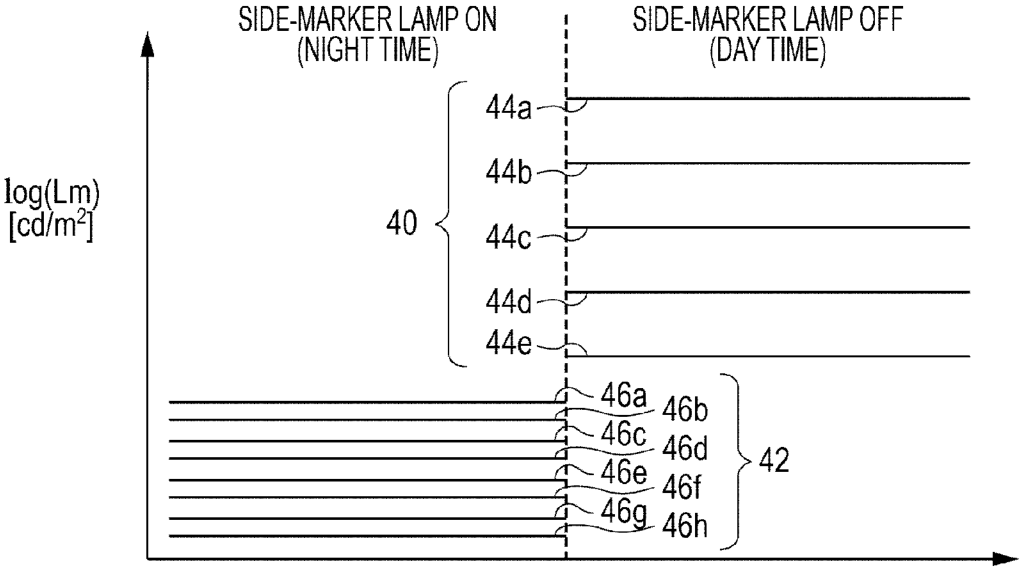
FIG. 2 illustrates setting of luminance of a meter according to the embodiment.

FIG. 2 illustrates setting of the meter luminance Lm according to the present embodiment. In FIG. 2, the meter luminance Lm is expressed logarithmically. As illustrated in FIG. 2, for the present embodiment, the meter luminance Lm can be broadly divided according to the position of the light SW 20. That is, when the light SW 20 is in the position at which both the headlamp and the side-marker lamp are in the off state, a daytime setting group 40 is used. When the light SW 20 is in the position at which only the side-marker lamp is in the on state or the position at which both the headlamp and the side-marker lamp are in the on state, a nighttime setting group 42 is used. The meter controller 32 selects the setting group 40 or 42 by whether the side-marker lamp is in the on or off state. That is, when the side-marker lamp is in the off state, the daytime setting group 40 is selected, whereas when the side-marker lamp is in the on state, the nighttime setting group 42 is selected.

The meter luminance Lm can be set in a plurality of stages of each of the daytime setting group 40 and the nighttime setting group 42. That is, as illustrated in FIG. 2, the daytime setting group 40 contains a plurality of settings **44*a* to 44*e*; the setting 44*c* is normal, the settings 44*a* and 44*b* are lighter, and the settings 44*d* and 44*e* are darker. Similarly, the nighttime setting group 42 contains a plurality of settings 46*a* to 46*h*; the setting 46*d* is normal, the settings 46*a* to 46*c* are lighter, and the settings 46*e* to 46*h*** are darker.

These settings **44*a* to 44*e* and 46*a* to 46*h* can be selected through the touch panel 18. Alternatively, they are selectable through the first illumination control SW 22. That is, when the light SW 20 is in the position at which both the headlamp and the side-marker lamp are in the off state, the daytime settings 44*a* to 44*e* can be selected by adjustment of the first illumination control SW 22. When the light SW 20 is in the position at which only the side-marker lamp is in the on state or the position at which both the headlamp and the side-marker lamp are in the on state, the nighttime settings 46*a* to 46*h* can be selected by adjustment of the first illumination control SW 22**.

The meter controller 32 controls the meter display 30 by the use of the above-described setting. That is, the controller 32 selects a specific one from among the settings **44*a* to 44*e* and 46*a* to 46*h* in accordance with information previously set through the touch panel 18 or the first illumination control SW 22 and in response to the signal S1 from the first illumination control SW 22. Then, the meter controller 32 causes the display 30** to present information at the meter luminance Lm corresponding to the selected setting.

(2) Control of Luminance of HUD 16

Figure 3:
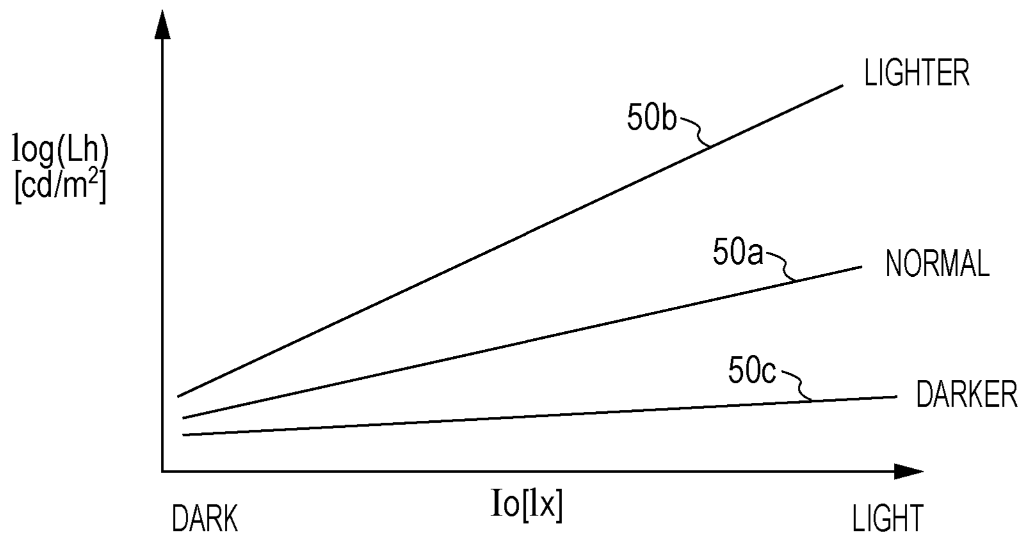
FIG. 3 illustrates characteristics of luminance of a HUD according to the embodiment.

FIG. 3 illustrates setting of the HUD luminance Lh according to the present embodiment. In FIG. 3, the HUD luminance Lh is expressed logarithmically. As illustrated in FIG. 3, for the present embodiment, the HUD luminance Lh can be selected from among a "normal" characteristic **50*a*, a "lighter" characteristic 50*b*, and a "darker" characteristic 50*c*. In the following, the characteristics 50*a* to 50*c* are collectively referred to as the characteristic 50. The characteristic 50 can be selected through the touch panel 18 or the second illumination control SW 24**.

Additionally, for the present embodiment, the characteristic 50 can be modified in accordance with the setting of the meter luminance Lm, as described below.

Figure 4:
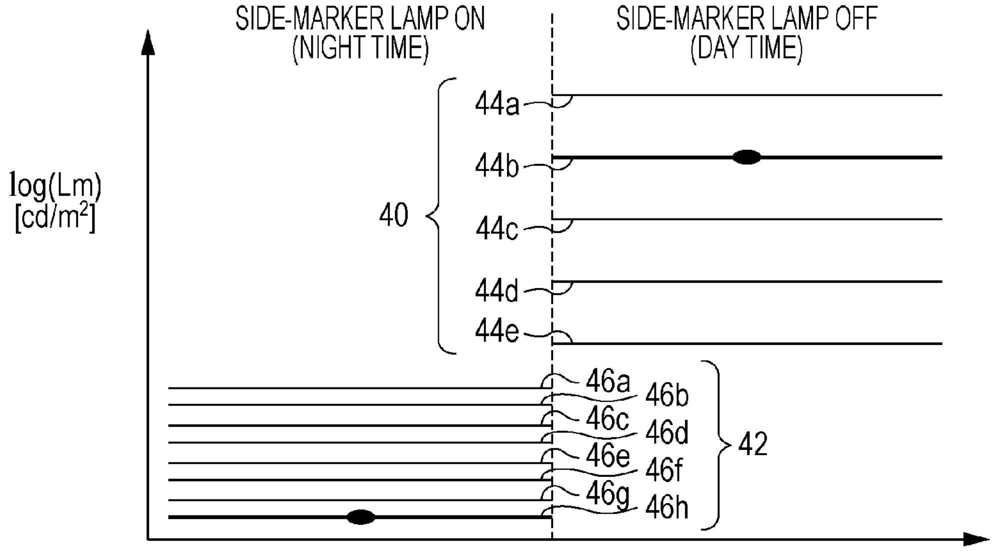
FIG. 4 illustrates an example of the setting of the luminance of the meter.
Figure 5:
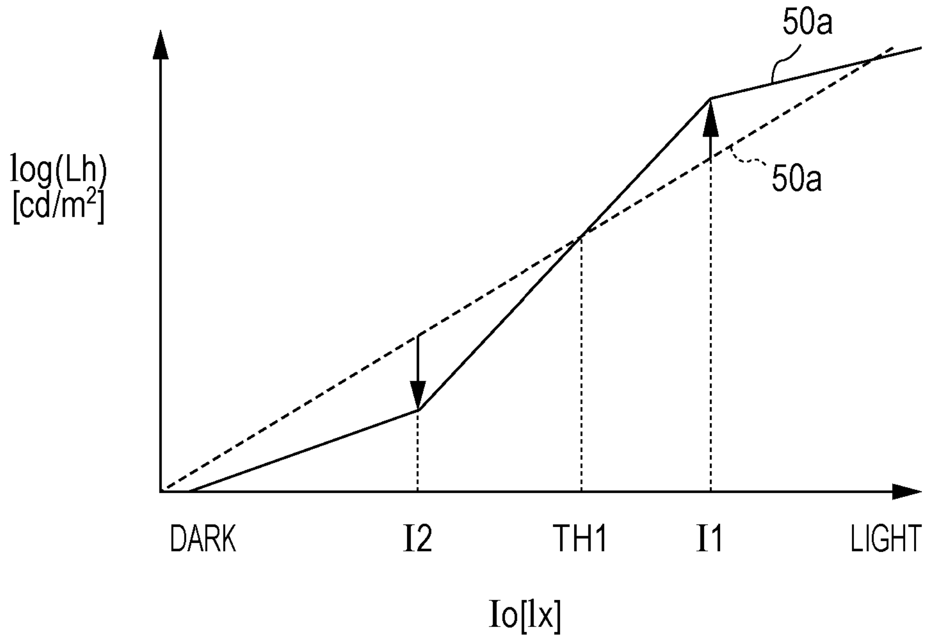
FIG. 5 illustrates how a characteristic of the luminance of the HUD is modified in accordance with the setting of the luminance of the meter illustrated in FIG. 4.

FIG. 4 illustrates one example of the setting of the meter luminance Lm. FIG. 5 illustrates how the characteristic (characteristic **50*a*) of the HUD luminance Lh is modified in accordance with the setting of the meter luminance Lm illustrated in FIG. 4. In FIG. 5, the characteristic 50*a* indicated by the broken line represents one before modification, and the characteristic 50*a*** indicated by the solid line represents one after modification.

For the example illustrated in FIG. 4, as the setting of the meter luminance Lm, the lighter setting **44*b* is selected for the daytime (side-marker lamp being in the off state), and the darker setting 46*h* is selected for the nighttime (side-marker lamp being in the on state). In FIG. 5, in accordance with the setting of the meter luminance Lm illustrated in FIG. 4, the characteristic 50 ("normal" characteristic 50*a***) of the HUD luminance Lh is modified.

That is, the characteristic **50*a* is modified so as to become lighter in a section that corresponds to the daytime in accordance with the setting 44*b* of the meter luminance Lm. Specifically, at a representative value I1 in the section corresponding to the daytime of the characteristic 50*a*, the logarithm of the HUD luminance Lh is raised in accordance with the setting 44*b*. The characteristic 50*a*** for daytime is modified so as to pass through the raised value.

In contrast, the characteristic **50*a* is modified so as to become darker in a section that corresponds to the nighttime in accordance with the setting 46*h* of the meter luminance Lm. Specifically, at a representative value I2 in the section corresponding to the nighttime of the characteristic 50*a*, the logarithm of the HUD luminance Lh is lowered in accordance with the setting 46*h*. The characteristic 50*a*** for nighttime is modified so as to pass through the lowered value.

As described above, the difference between the meter luminance Lm for daytime and that for nighttime is brought by selection of the light SW 20. The HUD luminance Lh differs between the daytime and nighttime at a threshold TH1 of the outside illuminance Io. Alternatively, a previously generated map of the relationship between the settings 44*a* to 44*e* and 46*a* to 46*h* for the daytime and nighttime of the meter luminance Lm and the characteristics 50*a* to 50*c* of the HUD luminance Lh may be used.

Figure 6:
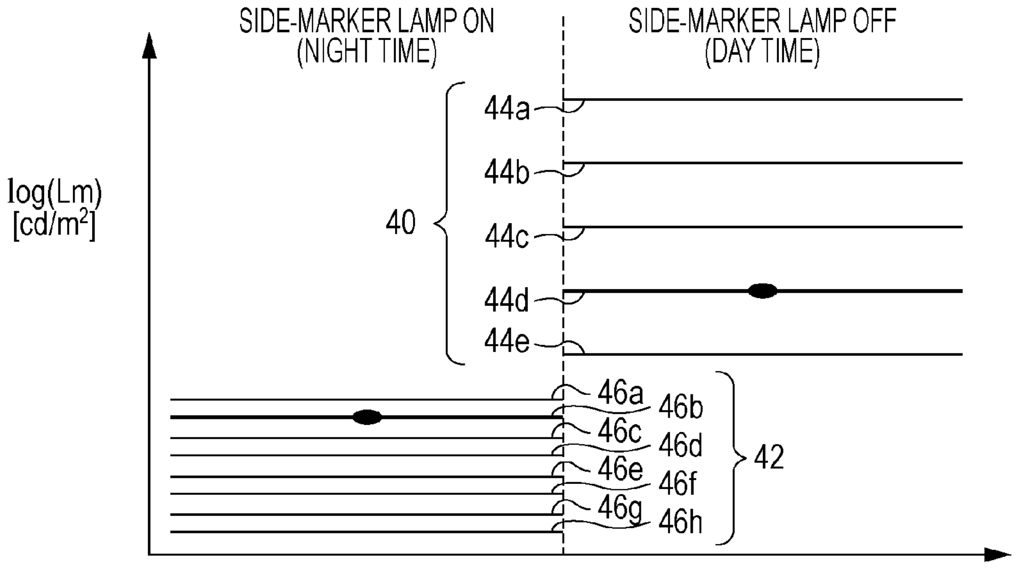
FIG. 6 illustrates another example of the setting of the luminance of the meter.
Figure 7:
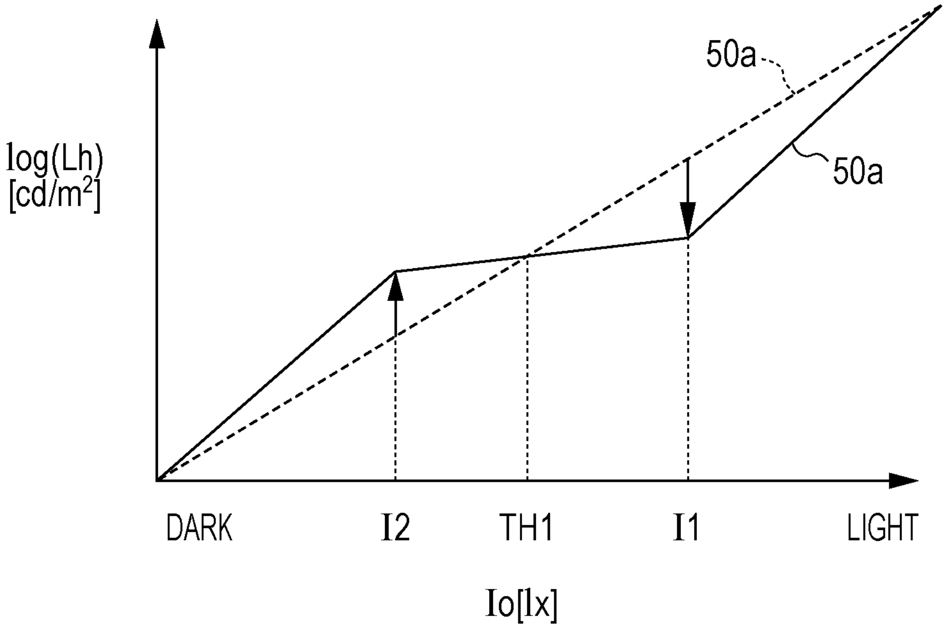
FIG. 7 illustrates the characteristic of the luminance of the HUD is modified in accordance with the setting of the luminance of the meter illustrated in FIG. 6.

FIG. 6 illustrates another example of the setting of the meter luminance Lm. FIG. 7 illustrates how the characteristic 50 (characteristic 50*a*) of the HUD luminance Lh is modified in accordance with the setting of the meter luminance Lm illustrated in FIG. 6. In FIG. 7, the characteristic 50*a* indicated by the broken line represents one before modification, and the characteristic 50*a* indicated by the solid line represents one after modification.

For the example illustrated in FIG. 6, as the setting of the meter luminance Lm, the darker setting 44*d* is selected for the daytime (side-marker lamp being in the off state), and the lighter setting 46*b* is selected for the nighttime. In FIG. 7, the characteristic ("normal" characteristic 50*a*) of the HUD luminance Lh is modified in accordance with the setting of the meter luminance Lm illustrated in FIG. 6. That is, the characteristic 50*a* is modified so as to become darker in a section that corresponds to the daytime in accordance with the setting 44*d* of the meter luminance Lm. Specifically, at a representative value I1 in the section corresponding to the daytime of the characteristic 50*a*, the logarithm of the HUD luminance Lh is lowered in accordance with the setting 44*d*. The characteristic 50*a* for daytime is modified so as to pass through the lowered value.

In contrast, the characteristic 50*a* is modified so as to become lighter in accordance with the setting 46*b* of the meter luminance Lm in a section that corresponds to the nighttime. Specifically, at a representative value I2 in the section corresponding to the nighttime of the characteristic 50*a*, the logarithm of the HUD luminance Lh is raised in accordance with the setting 46*b*. The characteristic 50*a* for nighttime is modified so as to pass through the raised value.

The above-described process is described below as processing at the HUD controller 36. That is, the HUD controller 36 selects the characteristic 50 of the HUD luminance Lh to be used this time from among the characteristics 50*a* to 50*c* in accordance with information previously set through the touch panel 18 or the second illumination control SW 24. The HUD controller 36 modifies the selected characteristic 50 in accordance with the setting of the meter luminance Lm at the meter controller 32. The setting of the meter luminance Lm is provided from the meter controller 32 to the HUD controller 36 through a signal Sm. The controller 36 obtains the outside illuminance Io from the illuminance sensor 26. Then, the controller 36 identifies the HUD luminance Lh from the modified characteristic 50 and the outside illuminance Io and causes the display 34 to present information at the identified HUD luminance Lh.

In FIGS. 5 and 7, an example in which the characteristic 50 is the normal characteristic 50*a* is described. However, even when the characteristic 50 is the lighter characteristic 50*b* or the darker characteristic 50*c*, the characteristic can be modified in substantially the same way.

3. Advantages of Present Embodiment

As described above, with the present embodiment, the characteristic 50 of the HUD luminance Lh of the HUD 16 varying with the outside illuminance Io can be changed by the use of the settings 44*a* to 44*e* and 46*a* to 46*h* of the meter luminance Lm. Therefore, the setting of the meter luminance Lm for each of the daytime and nighttime specified by the user (orientation of the setting) can be reflected in the HUD luminance Lh corresponding to the outside illuminance Io. Accordingly, the HUD luminance Lh can be controlled more flexibly, and thus usability can be improved.

4. Variations

The present invention is not limited to the above-described embodiment, and various configurations based on this description can be used. Other example configurations that can be used are described below.

For the above-described embodiment, the vehicle display apparatus 12 is mounted on the vehicle 10. However, it can also be mounted on transportation other than the vehicle 10 (e.g., airplane, helicopter, ship).

For the above-described embodiment, the HUD 16 is incorporated in the windshield. However, it may also be incorporated in a site other than the windshield (e.g., side window). Instead of the HUD 16 fixed to the vehicle 10, a head-mounted display may also be used.

For the above-described embodiment, the HUD luminance Lh is adjusted in accordance with the meter luminance Lm. However, other adjustment may be used. For example, the luminance of the touch panel 18 may also be adjusted in accordance with the meter luminance Lm.

For the above-described embodiment, the luminance of each of the meter 14 and the HUD 16 is set using the touch panel 18, the first illumination control SW 22, or the second illumination control SW 24. However, other settings may be used. For example, setting may be made by an input to an operation switch on a steering wheel from a customized menu of a liquid-crystal multi-information display (MID) on, for example, an instrument panel. The luminance of each of the meter 14 and the MID may be set by the use of a traditional illumination control knob, and the luminance of the HUD 16 may be set by the use of the above-described touch panel 18 or MID and steering switch.

For the above-described embodiment, two-stage control corresponding to the nighttime and daytime associated with the on and off states of the side-marker lamp is carried out. However, three-stage control corresponding to the nighttime, daytime, and twilight associated with three positions of the light SW 20 may also be carried out. For the above-described embodiment, the light SW 20 can be switchable among three positions. However, the light SW 20 may also be switchable only between two positions, such as the position at which both the headlamp and the side-marker lamp are in the on state and the position at which both are in the off state.

For the above-described embodiment, as illustrated in FIGS. 5 and 7, the characteristic 50 is controlled so as to be modified such that, after the HUD luminance Lh at the representative values I1 and I2 is raised or lowered, the characteristic 50 is made to pass through the raised or lowered value. However, other control may be used.

With the embodiment of the present invention, for a vehicle including a first indicator and a second indicator disposed in its cabin, the luminance of the second indicator can be changed at least in a portion of the luminance range (curve characteristic) in accordance with individually set daytime luminance and nighttime luminance when the luminance of the second indicator can be set in only the luminance range varying with the illuminance outside the vehicle. Therefore, orientation of the setting of luminance specified by the user for each of daytime and nighttime can be reflected in the luminance corresponding to the illuminance outside the vehicle. Accordingly, the luminance can be controlled more flexibly, and thus usability can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle display apparatus comprising:

a first indicator disposed in a cabin of a vehicle, the first indicator being configured to display information at a first display luminance for daytime and for nighttime;

a second indicator configured to display information at a second display luminance;

a first luminance setting device configured to allow a user to select a setting of the first display luminance of the first indicator;

a first controller configured to control the first indicator to display information at the first display luminance based on the setting of the first display luminance selected through the first luminance setting device;

an illuminance detector configured to detect an outside illuminance outside the vehicle; and a second controller configured to control the second indicator to display information at the second display luminance based on display luminance characteristics of the second indicator and the outside illuminance detected by the illuminance detector, the display luminance characteristics of the second indicator including a relationship between the second display luminance and the outside illuminance detected by the illuminance detector, wherein the second controller is configured to modify at least part of the display luminance characteristics of the second indicator, if the setting of the first display luminance selected through the first luminance setting device is lighter than a predetermined display luminance, so that the second display luminance of the second indicator increases, and wherein the display luminance characteristics of the second indicator includes a plurality of display luminance characteristics having different display luminance of the second indicator with respect to the outside illuminance detected by the illuminance detector, further comprising a second luminance setting device configured to allow a user to select one of the plurality of display luminance characteristics of the second indicator, wherein the second controller is configured to modify at least part of display luminance characteristics selected from the plurality of display luminance characteristics through the second luminance setting device, if the setting of the first display luminance selected through the first luminance setting device is lighter than the predetermined display luminance, so that the second display luminance of the second indicator increases.

2. The vehicle display apparatus according to claim 1, wherein the first display luminance for daytime of the first indicator has a plurality of stages of luminance settings.

3. The vehicle display apparatus according to claim 1, wherein the first display luminance for nighttime of the first indicator has a plurality of stages of luminance settings.

4. The vehicle display apparatus according to claim 1, wherein the second controller is configured to modify at least part of the display luminance characteristics of the second indicator, if the setting of the first display luminance selected through the first luminance setting device is darker than the predetermined display luminance, so that the second display luminance of the second indicator decreases.

5. The vehicle display apparatus according to claim 1, wherein the second controller is configured to modify at least part of display luminance characteristics selected from the plurality of display luminance characteristics through the second luminance setting device, if the setting of the first display luminance selected through the first luminance setting device is darker than the predetermined display luminance, so that the second display luminance of the second indicator decreases.

6. A vehicle display apparatus comprising:

a first indicator disposed in a cabin of a vehicle, the first indicator being configured to display information at a first display luminance for daytime and for nighttime;

a second indicator configured to display information at a second display luminance;

a first luminance setting device configured to allow a user to select a setting of the first display luminance of the first indicator;

a first controller configured to control the first indicator to display information at the first display luminance based on the setting of the first display luminance selected through the first luminance setting device;

an illuminance detector configured to detect an outside illuminance outside the vehicle; and a second controller configured to control the second indicator to display information at the second display luminance based on display luminance characteristics of the second indicator and the outside illuminance detected by the illuminance detector, the display luminance characteristics of the second indicator including a relationship between the second display luminance and the outside illuminance detected by the illuminance detector, wherein the second controller is configured to modify at least part of the display luminance characteristics of the second indicator, if the setting of the first display luminance selected through the first luminance setting device is lighter than a predetermined display luminance, so that the second display luminance of the second indicator increases, wherein the display luminance characteristics of the second indicator includes a daytime range and a nighttime range, the daytime range corresponding to the outside illuminance lighter than a predetermined threshold, the nighttime range corresponding to the outside illuminance darker than the predetermined threshold, wherein the second controller is configured to modify at least part of the display luminance characteristics in the daytime range, if the setting of the first display luminance selected through the first luminance setting device is lighter than the predetermined display luminance and if the outside illuminance detected by the illuminance detector is lighter than the predetermined threshold, so that the second display luminance of the second indicator increases in accordance with the setting of the first display luminance selected through the first luminance setting device, and wherein the second controller is configured to modify at least part of the display luminance characteristics in the nighttime range, if the setting of the first display luminance selected through the first luminance setting device is lighter than the predetermined display luminance and if the outside illuminance detected by the illuminance detector is darker than the predetermined threshold, so that the second display luminance of the second indicator increases in accordance with the setting of the first display luminance selected through the first luminance setting device.

7. The vehicle display apparatus according to claim 6, wherein the first luminance setting device is configured to allow a user to select one of a daytime setting group of display luminance for daytime of the first indicator and a nighttime setting group of display luminance for nighttime of the first indicator, wherein the first luminance setting device is configured to allow a user to select a daytime setting of the first display luminance from the daytime setting group, and wherein the first luminance setting device is configured to allow a user to select a nighttime setting of the first display luminance from the nighttime setting group.

8. The vehicle display apparatus according to claim 7, wherein the second controller is configured to modify at least part of the display luminance characteristics in the daytime range, if the daytime setting of the first display luminance selected through the first luminance setting device is lighter than the predetermined display luminance and if the outside illuminance detected by the illuminance detector is lighter than the predetermined threshold, so that the second display luminance of the second indicator increases in accordance with the daytime setting of the first display luminance selected through the first luminance setting device, and wherein the second controller is configured to modify at least part of the display luminance characteristics in the nighttime range, if the nighttime setting of the first display luminance selected through the first luminance setting device is lighter than the predetermined display luminance and if the outside illuminance detected by the illuminance detector is darker than the predetermined threshold, so that the second display luminance of the second indicator increases in accordance with the nighttime setting of the first display luminance selected through the first luminance setting device.

9. The vehicle display apparatus according to claim 8, wherein the second controller is configured to modify at least part of the display luminance characteristics in the daytime range, if the daytime setting of the first display luminance selected through the first luminance setting device is darker than the predetermined display luminance and if the outside illuminance detected by the illuminance detector is lighter than the predetermined threshold, so that the second display luminance of the second indicator decreases in accordance with the daytime setting of the first display luminance selected through the first luminance setting device, and wherein the second controller is configured to modify at least part of the display luminance characteristics in the nighttime range, if the nighttime setting of the first display luminance selected through the first luminance setting device is darker than the predetermined display luminance and if the outside illuminance detected by the illuminance detector is darker than the predetermined threshold, so that the second display luminance of the second indicator decreases in accordance with the nighttime setting of the first display luminance selected through the first luminance setting device.

10. The vehicle display apparatus according to claim 6, wherein the second controller is configured to modify at least part of the display luminance characteristics of the second indicator, if the setting of the first display luminance selected through the first luminance setting device is darker than the predetermined display luminance, so that the second display luminance of the second indicator decreases.

11. The vehicle display apparatus according to claim 10, wherein the second controller is configured to modify at least part of the display luminance characteristics in the daytime range, if the setting of the first display luminance selected through the first luminance setting device is darker than the predetermined display luminance and if the outside illuminance detected by the illuminance detector is lighter than the predetermined threshold, so that the second display luminance of the second indicator decreases in accordance with the setting of the first display luminance selected through the first luminance setting device, and wherein the second controller is configured to modify at least part of the display luminance characteristics in the nighttime range, if the setting of the first display luminance selected through the first luminance setting device is darker than the predetermined display luminance and if the outside illuminance detected by the illuminance detector is darker than the predetermined threshold, so that the second display luminance of the second indicator decreases in accordance with the setting of the first display luminance selected through the first luminance setting device.

12. A vehicle display apparatus comprising:

a first indicator disposed in a cabin of a vehicle, the first indicator being configured to display information at a first display luminance for daytime and for nighttime;

a second indicator configured to display information at a second display luminance;

a first luminance setting device configured to allow a user to select a setting of the first display luminance of the first indicator;

a first controller configured to control the first indicator to display information at the first display luminance based on the setting of the first display luminance selected through the first luminance setting device;

an illuminance detector configured to detect an outside illuminance outside the vehicle; and a second controller configured to control the second indicator to display information at the second display luminance based on display luminance characteristics of the second indicator and the outside illuminance detected by the illuminance detector, the display luminance characteristics of the second indicator including a relationship between the second display luminance and the outside illuminance detected by the illuminance detector, wherein the second controller is configured to modify at least part of the display luminance characteristics of the second indicator, if the setting of the first display luminance selected through the first luminance setting device is darker than a predetermined display luminance, so that the second display luminance of the second indicator decreases, wherein the display luminance characteristics of the second indicator includes a daytime range and a nighttime range, the daytime range corresponding to the outside illuminance lighter than a predetermined threshold, the nighttime range corresponding to the outside illuminance darker than the predetermined threshold, wherein the second controller is configured to modify at least part of the display luminance characteristics in the daytime range, if the setting of the first display luminance selected through the first luminance setting device is darker than the predetermined display luminance and if the outside illuminance detected by the illuminance detector is lighter than the predetermined threshold, so that the second display luminance of the second indicator decreases in accordance with the setting of the first display luminance selected through the first luminance setting device, and wherein the second controller is configured to modify at least part of the display luminance characteristics in the nighttime range, if the setting of the first display luminance selected through the first luminance setting device is darker than the predetermined display luminance and if the outside illuminance detected by the illuminance detector is darker than the predetermined threshold, so that the second display luminance of the second indicator decreases in accordance with the setting of the first display luminance selected through the first luminance setting device.

13. The vehicle display apparatus according to claim 12, wherein the first luminance setting device is configured to allow a user to select one of a daytime setting group of display luminance for daytime of the first indicator and a nighttime setting group of display luminance for nighttime of the first indicator, wherein the first luminance setting device is configured to allow a user to select a daytime setting of the first display luminance from the daytime setting group, and wherein the first luminance setting device is configured to allow a user to select a nighttime setting of the first display luminance from the nighttime setting group.

14. The vehicle display apparatus according to claim 13, wherein the second controller is configured to modify at least part of the display luminance characteristics in the daytime range, if the daytime setting of the first display luminance selected through the first luminance setting device is darker than the predetermined display luminance and if the outside illuminance detected by the illuminance detector is lighter than the predetermined threshold, so that the second display luminance of the second indicator decreases in accordance with the daytime setting of the first display luminance selected through the first luminance setting device, and wherein the second controller is configured to modify at least part of the display luminance characteristics in the nighttime range, if the nighttime setting of the first display luminance selected through the first luminance setting device is darker than the predetermined display luminance and if the outside illuminance detected by the illuminance detector is darker than the predetermined threshold, so that the second display luminance of the second indicator decreases in accordance with the nighttime setting of the first display luminance selected through the first luminance setting device.

* * * * *